United States Patent
Hiraga et al.

(10) Patent No.: US 6,268,469 B1
(45) Date of Patent: Jul. 31, 2001

(54) SOLID-LIQUID SEPARATION METHOD OF FLUORINE-CONTAINING POLYMER PARTICLES

(75) Inventors: Yoshiyuki Hiraga; Satoshi Komatsu; Tomohisa Noda; Hiroyuki Imanishi, all of Settsu (JP)

(73) Assignee: Daikin Insdustries, Ltd., Osaka (JP)

( * ) Notice: Subject to any disclaimer, the term of this patent is extended or adjusted under 35 U.S.C. 154(b) by 0 days.

(21) Appl. No.: 09/292,855

(22) Filed: Apr. 16, 1999

(30) Foreign Application Priority Data

Apr. 16, 1998 (JP) .................................. 10-106343

(51) Int. Cl.$^7$ .................................. C08F 6/22; C08F 6/24
(52) U.S. Cl. .................... 528/490; 210/702; 210/703; 210/705; 210/708; 210/723; 526/242; 528/502 A; 528/502 C
(58) Field of Search ..................................... 210/705, 702, 210/703, 708, 723; 528/490, 502 A, 502 C; 526/242

(56) References Cited

U.S. PATENT DOCUMENTS

| | | | |
|---|---|---|---|
| 5,397,829 | * 3/1995 | Morgan | 524/463 |
| 5,543,217 | * 8/1996 | Morgan | 428/375 |
| 5,547,761 | * 8/1996 | Chapman, Jr. | 428/422 |
| 5,708,131 | * 1/1998 | Morgan | 528/481 |
| 5,780,552 | * 7/1998 | Kerbow | 525/276 |
| 5,932,673 | * 8/1999 | Aten | 526/247 |

* cited by examiner

*Primary Examiner*—Fred Zitomer
(74) *Attorney, Agent, or Firm*—Sughrue, Mion, Zinn, Macpeak & Seas, PLLC

(57) ABSTRACT

Coagulated particles having a low water content are separated and recovered from an emulsified dispersion of fluorine-containing polymer particles. A solid-liquid separation method comprising: a step for adding a coagulant in an emulsified dispersion of fluorine-containing polymer particles to coagulate the fluorine-containing polymer particles with stirring and obtain a slurry of coagulated particles, a step for filtrating the slurry, and a step for pressing the obtained cake. It is preferable to continuously carry out the filtration step and pressing step with a filter press or a belt press. Also a washing step may be provided after the filtration step.

13 Claims, No Drawings

SOLID-LIQUID SEPARATION METHOD OF FLUORINE-CONTAINING POLYMER PARTICLES

TECHNICAL FIELD

The present invention relates to a solid-liquid separation method of an emulsified dispersion of fluorine-containing polymer particles.

BACKGROUND OF THE INVENTION

A fluorine-containing polymer is prepared by emulsion polymerization method, suspension polymerization method or the like method. The fluorine-containing polymer prepared by emulsion polymerization is in a state that primary particles of the polymer having an average particle size of from several tens of nanometers to hundreds of nanometers are emulsified and dispersed in water. Since it is difficult to directly filtrate the fine primary particles in such an emulsified dispersion, those primary particles are coagulated into secondary particles having an average particle size of several microns to hundreds of microns and then filtrated.

Known methods for the above-mentioned coagulation are as follows.

(1) A method for coagulation by stirring an emulsified dispersion mechanically to apply shearing force to the dispersion and break an emulsified state.

(2) A method for coagulation by adding a coagulant and then stirring to break an emulsified state.

(3) A method for coagulation by adding a water-insoluble organic solvent to an emulsified dispersion and then stirring to coagulate fluorine-containing polymer particles in droplets of the organic solvent. After the coagulation, the organic solvent is removed (for example, JP-B-60-240713).

The both methods (1) and (2) are methods for breaking an emulsified state to coagulate polymer particles. By breaking an emulsified state of fluorine-containing polymer, coagulated secondary particles become water-repellent. The water-repellent fluorine-containing polymer particles are hardly redispersed, that is, hardly becoming in the form of slurry, which makes it difficult to feed the particles into a filtration step. Also water retained in the water-repellent coagulated particles is hardly released from the particles. Therefore it is difficult to decrease a water content greatly by the filtration method and it takes a long period of time for heating and drying. Further since a dried powder has a large space having been occupied by water, its apparent density becomes very small and handling property thereof is not so good, which results in occurrence of bridging in a powder storage tank and an increase in equipment size.

In conventional methods, primary dewatering of coagulated particles has been usually carried out by solid-liquid separation means and then heating and drying follow. Usually the solid-liquid separation of a dispersion of fluorine-containing resin is carried out by filtration, particularly by using filtration means which causes the filtrated cake to have a free surface. This is because when the fluorine-containing polymer particles are water-repellent, they are in a state of being floating on the separated water. Examples of such filtration means are Nutsche filtration, press filtration in which pressurized dispersion is fed onto the sole surface of filtration medium, and filtration under reduced pressure (suction) which utilizes the sole surface of filtration medium.

If it is intended to let a cake have a free surface, cracking occurs on the cake and water content cannot be lowered further. That phenomenon arises in case of the coagulation methods of above (1) and (2). If the water content is not lowered, in case where the obtained cake is heated and dried, a resulting powder has a small apparent density and poor handling property as mentioned above.

On the other hand, the above method (3) is a method for coagulating without breaking an emulsified state. Therefore particles do not become water-repellent and thus the above-mentioned problems in the filtration step do not arise. However since an organic solvent is used, an increase in cost is resulted and equipment for recovering the organic solvent is required and besides environmental problem arises due to exhaust water and gas.

SUMMARY OF THE INVENTION

The present invention relates to the solid-liquid separation method of an emulsified dispersion of fluorine-containing polymer particles which can greatly decrease a water content of coagulated particles of fluorine-containing polymer.

The solid-liquid separation method of the present invention comprises:

a step for adding a coagulant in an emulsified dispersion of fluorine-containing polymer particles to coagulate the fluorine-containing polymer particles with stirring and obtain a slurry of coagulated particles (coagulation step), a step for filtrating the slurry (filtration step), and a step for pressing the obtained cake (pressing step).

The washing step may be provided before the pressing step to wash the filtrated cake.

DETAILED DESCRIPTION

The solid-liquid separation method of the present invention is suitable particularly for solid-liquid separation of an emulsified dispersion of fluorine-containing polymer particles which is prepared by emulsion polymerization, in which the fluorine-containing polymer is tetrafluoroethylene (TFE) homopolymer (PTFE), vinylidene fluoride (VdF) homopolymer (PVdF), chlorotrifluoroethylene (CTFE) homopolymer (PCTFE) or a copolymer of at least two monomers selected from the group consisting of TFE, VdF, CTFE, hexafluoropropylene (HFP), perfluoro(alkyl vinyl ether) and ethylene.

Examples of perfluoro(alkyl vinyl ether) monomer are vinyl ethers represented by the formula (1):

$$CF_2=CFO(CF_2)_mF \quad (1)$$

in which m is an integer of 1 to 6, and the formula (2):

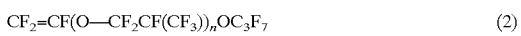

$$CF_2=CF(O-CF_2CF(CF_3))_nOC_3F_7 \quad (2)$$

in which n is an integer of 1 to 4.

Examples of the fluorine-containing copolymer are, for instance, TFE/VdF copolymer, TFE/HFP copolymer, TFE/perfluoro(alkyl vinyl ether) copolymer, TFE/ethylene copolymer, TFE/CTFE copolymer, TFE/HFP/perfluoro (alkyl vinyl ether) copolymer, and the like.

An average particle size of primary particles of the polymer is from 80 to 300 nm.

An emulsifying agent in the emulsified dispersion does not have a substantial effect on the method of the present invention.

The coagulation step of the method of the present invention is carried out by adding a coagulant with stirring under the condition of preventing the coagulated fluorine-containing polymer particles in a slurry from becoming water-repellent. Such a condition can be produced by, for example, using an inorganic acid as a coagulant and regulating a stirring speed and an adding amount of the coagulant.

The use of an inorganic acid as the coagulant is preferred from the viewpoint that a surface activating effect of the emulsifying agent being adsorbed on the surface of polymer particles is lowered and the particles are easily coagulated. Examples of the preferred inorganic acid are hydrochloric acid, sulfuric acid, nitric acid and the like. Particularly nitric acid is preferable from the viewpoint of handling property and corrosion of materials of each equipment. An adding amount of the inorganic acid differs depending on kind thereof, primary particle size of the polymer, and kind and amount of an emulsifying agent to be used. Basically from the viewpoint of preventing the coagulated particles from becoming water-repellent, it is preferable that the adding amount of the inorganic acid is from 0.1 to 20 parts (part by weight, hereinafter the same), particularly from 0.5 to 10 parts based on 100 parts of the fluorine-containing polymer particles. When the adding amount is too much, it causes the particles to become water-repellent. When too small, coagulation becomes insufficient and thereafter solid-liquid separation cannot be carried out easily.

In case of strong stirring, a shearing force to be applied becomes too big and the particles become water-repellent. A shearing force to be produced differs depending on kind of stirring apparatus, and a suitable degree of stirring which can be applied to any methods of stirring cannot be determined unconditionally. However the particles must not become water-repellent at least only by stirring. The stirring speed is determined experimentally in each practical combination.

A coagulation temperature is preferably from 10° to 100° C., particularly from 20° to 80° C.

In the coagulation step, primary particles of the fluorine-containing polymer become coagulated secondary particles and the emulsified dispersion becomes in the form of homogeneous slurry. The slurry is then fed to the filtration step. As mentioned above, in conventional coagulation method, since the coagulated particles become water-repellent, homogeneous slurry cannot be obtained, and when feeding solution to the filtration step, there occurs, in some cases, a problem that solid (polymer) portion cannot be fed. In the method of the present invention, since the homogeneous slurry is obtained, such a problem mentioned above does not occur.

In the filtration step of the present invention, the slurry obtained in the coagulation step is filtrated for primary dewatering. A preferred filtration means is one equipped with a press mechanism mentioned below but not a conventional one causing a cake to have a free surface. Since the coagulated particles in a slurry obtained in the above-mentioned coagulation step of the present invention are not water-repellent substantially, water contained in the coagulated particles is easily released, which can enhance dewatering efficiency and lower a water content in the obtained cake greatly.

Examples of the filtration means equipped with a press mechanism and used suitably in the present invention are filter press method, belt press method and the like. In those filtration means, it is preferable that an effective filtration area where the filtration is carried out, for example, a filtrating chamber in case of the filter press method and a filter medium or filter cloth corresponding to upper and lower filter cloth belts in case of the belt press method, occupies not less than 30%, preferably not less than 60% of total inner surface area of the filtration portion from the viewpoint that the following pressing step can be easily carried out.

Examples of material for the filter medium are, for instance, stainless steel, other metals and the like. Examples of material for the filter cloth are, for instance, polypropylene, PTFE, polyethylene and the like. Particularly preferred materials are deformable materials, for example, polypropylene, PTFE and polyethylene from the viewpoint of making the pressing easy.

In the filtration step, a filtrated cake having a water content on dry basis of not more than 250%, particularly not more than 200% can be obtained.

In the present invention, in order to further decrease the water content, the filtrated cake is subjected to pressing subsequently to the filtration step. It is preferable that the pressing step is conducted immediately after the filtration step from the viewpoint that dewatering can be carried out easily by applying pressure on the cake retained in the filtration chamber. Therefore it is preferable to use a filter press or belt press which can carry out the filtration step and pressing step with the same equipment.

Pressing method and conditions differ depending on equipment to be used and may be determined experimentally for the respective equipments.

For example, when the filter press is used, a slurry is fed to a filtration chamber at a filtration pressure of from 0.1 to 1 MPa, preferably from 0.4 to 0.7 MPa. Immediately after the filtration, a compressed air of from 0.4 to 3.0 MPa, preferably from 0.7 to 2.0 MPa is introduced in a diaphragm and then a filtrated cake is pressed.

When using the belt press, too, the same conditions can be employed.

By the pressing step, the water content can be further decreased, for example, to not more than 180%, particularly not more than 100% on dry basis. In addition, compaction is generated and an apparent density is increased. Thus powder characteristics (handling property, flowability, etc.) can be improved and an amount of fine powder generated at the time of drying can be decreased.

In the solid-liquid separation method of the present invention, after the filtration step, a washing step may be provided for washing the filtrated cake with water. By the addition of the washing step, residues of the initiator and emulsifying agent used at the time of polymerization and the coagulant can be removed. Particularly while the coagulated particles obtained in the coagulation step of the present invention contain water which is easily taken out of the particles as mentioned above, washing water is also easy to pass through the coagulated particles, thus giving excellent washing efficiency.

An amount of washing water varies depending on kinds and amounts of initiator, emulsifying agent and coagulant to be used, and can be made relatively small, that is, 2 to 10 times the amount of fluorine-containing polymer particles (based on dry weight). As the washing advances, impurities decrease, pH of exhaust washing water approximates to neutral value and electric conductivity decreases. Therefore at the time when the measured values of pH and electric conductivity of exhaust washing water stop fluctuating, the washing may be terminated. Aimed pH and electric conductivity for terminating the washing are from 5 to 7 and not more than 0.25 ms/cm, respectively.

After completion of the washing step, the above-mentioned pressing step is carried out immediately.

Then the obtained pressed cake is taken out and dried. In conventional method, in order to decrease water content to not more than 0.1%, it is necessary to dry at about 150° C. for not less than two hours. However water content of the pressed cake obtained in the method of the present invention can be decreased to not more than 0.1% by drying at about 125° C. to about 150° C. for a shorter period of time of 15 to 60 minutes. This is because water content of the pressed cake itself is small and in addition, water in the coagulated particles is easy to come out from the particles.

The coagulated powder of fluorine-containing polymer obtained by dewatering and drying through the solid-liquid separation method of the present invention has a high apparent density and further a high flowability and contains only a small amount of impurities.

Hereinafter, the solid-liquid separation method of the present invention is specifically explained on the basis of examples, but the present invention is not limited to the examples.

EXAMPLE 1

To 20 kg of an emulsified dispersion of copolymer obtained by emulsion polymerization of tetrafluoroethylene and hexafluoropropylene (dry weight of copolymer: 1.4 kg, average particle size: 110 nm) was added 14 g of nitric acid, followed by coagulating with stirring while the mixture being left open to the air. An inside diameter of a vessel used for the coagulation was 40 cm, a diameter of a stirring blade was 30 cm, a tip end speed of the stirring blade was 60 cm/s, a liquid temperature at the time of coagulation was 60° C. and a stirring time was 20 minutes. Coagulated particles in a slurry obtained after the coagulation was not water-repellent. The slurry was pressurized to 0.4 MPa with compressed air, transferred to a filter press and then filtrated. With respect to the filter press used, an average size of opening of filter medium was 30 μm, the filter medium was made of polypropylene, a volume of filter chamber was 1.5 liters, a total inner surface area of the filter chamber was 0.1 m², and a proportion of an effective filtration area covered with the filter medium to the total inner surface area of the filter chamber was 85%. While transferring the slurry, the stirring was continued at a tip end speed of 20 cm/s, and after the transfer, almost no polymer was left in the coagulation vessel. After the filtration of a total amount of the slurry, a pressure of 1.5 MPa was applied to a diaphragm portion of the filter press with compressed air to press the filtrated cake in the filtration chamber. After 3-minute pressing, the diaphragm portion was restored to an atmospheric pressure and the pressed cake was taken out of the filtration chamber.

Water content of the obtained pressed cake was measured at several points thereof, and as a result, all the measured values were as low as about 60%. Also after having been dried at 150° C. for 40 minutes, the pressed cake was pulverized to a powder having an average particle size of 500 μm. An apparent density of the powder was as high as 0.9 g/cm³.

EXAMPLE 2

Filtration was carried out under the same conditions as in Example 1 by using the same filter press. Then washing water (deionized water) was passed at a pressure of 0.4 MPa through a filtrated cake to carry out washing. An amount of washing water and pH and electric conductivity of exhaust washing water are shown in Table 1.

At the time when 9 kg of washing water was flowed, the washing was terminated, and the pressing step was carried out under the same conditions as in Example 1 to give a pressed cake. A water content of the pressed cake was 58% on dry basis.

When 0.1 kg of the pressed cake was poured in 1 kg of deionized water, the cake was re-dispersed immediately. That water dispersion had pH of 6.85 and electric conductivity of 0.2 ms/cm. Most of a coagulant and impurities had been removed from the polymer particles.

An apparent density of a powder obtained by drying the pressed cake in the same manner as in Example 1 and pulverizing to an average particle size of 500 μm was 0.95 g/cm³.

TABLE 1

| Amount of washing water (kg) | Amount of washing water (kg-water/ kg-cry cake) | pH of exhaust washing water | Electric conductivity of exhaust washing water (ms/cm) |
|---|---|---|---|
| 0 to 0.1 | 0.07 | 2.66 | 1.2 |
| 0.1 to 4 | 2.86 | 3.19 | 0.57 |
| 4 to 6 | 4.29 | 3.68 | 0.31 |
| 6 to 8 | 5.71 | 6.1 | 0.21 |
| 8 to 9 | 6.42 | 6.9 | 0.2 |

COMPARATIVE EXAMPLE 1

Coagulation was carried out under the same conditions as in Example 1 except that the tip end speed of the stirring blade at the time of the coagulation was changed to 120 cm/s. Coagulated particles in the obtained slurry was water-repellent.

The slurry was fed to the same filter press as in Example 1 with compressed air of 0.4 MPa while stirring at the tip end speed of 40 cm/s and then filtrated. The feeding of the slurry was not complete and 0.5 kg (dry weight) of coagulated particles remained in the coagulation vessel.

COMPARATIVE EXAMPLE 2

Coagulation was carried out under the same conditions as in Example 1, and Nutsche filter having a diameter of 10 cm and being capable of filtration under reduced pressure was charged with 300 g of the obtained slurry to conduct the filtration under reduced pressure. With advance of dewatering, since cracking occurred on a cake and a filtrate stopped coming out, the filtration was terminated and a water content was measured. The water content on dry basis was as high as 278%. Also the cake was dried at 150° C. for 120 minutes. The dried cake was very fragile and its apparent density was as small as 0.3 g/cc.

COMPARATIVE EXAMPLE 3

After filtration with Nutsche filter of Comparative Example 2, deionized water was passed in the obtained filtrated cake to carry out washing. The washing was also carried out under reduced pressure. An amount of washing water and pH and electric conductivity of exhaust washing water are shown in Table 2.

TABLE 2

| Amount of washing water (kg) | Amount of washing water (kg-water/ kg-dry cake) | pH or exhaust washing water | Electric conductivity of exhaust washing water (ms/cm) |
|---|---|---|---|
| 0 to 0.0015 | 0.07 | 31.4 | 1.1 |
| 0.0015 to 0.06 | 2.86 | 4.25 | 0.95 |
| 0.06 to 0.09 | 4.29 | 4.54 | 0.93 |
| 0.09 to 0.12 | 5.71 | 4.78 | 0.90 |
| 0.12 to 0.135 | 6.42 | 4.85 | 0.89 |

0.01 Kg of wet cake obtained by washing with 0.135 kg of washing water was re-dispersed in 0.1 kg of water, and pH and electric conductivity of the dispersion were measured. The measured pH and electric conductivity were 3.20 and 0.95 ms/cm, respectively. From the results of the measurements, it is seen that the washing by Nutsche filtration is not effective.

COMPARATIVE EXAMPLE 4

Coagulation was carried out under the same conditions as in Example 1, and the obtained slurry was treated with a screw decanter which is a centrifugal separator (Sharples Super-D-canter P-660 available from Tomoe Kogyo Co., Ltd.) A centrifugal effect and treating speed were changed to 2000 to 3000 G and 200 to 400 kg/hr, respectively. The water content of the treated product was as high as 250 to 300% on dry basis.

According to the solid-liquid separation method of the present invention, coagulated particles having a low water content and giving a good washing effect can be obtained from an emulsified dispersion of fluorine-containing polymer particles. The obtained dried particles has a high apparent density and is excellent in powder characteristics.

What we claim is:

1. A solid-liquid separation method comprising:

adding a coagulant with stirring in an emulsified aqueous dispersion of fluorine-containing polymer particles to coagulate the fluorine-containing polymer particles and obtain a slurry of coagulated particles, and carrying out said coagulation under conditions which prevent the coagulated fluorine-containing polymer particles from becoming water-repellent, filtering the slurry to obtain a cake, and pressing the cake.

2. The solid-liquid separation method of claim 1, wherein the coagulant comprises an inorganic acid.

3. The solid-liquid separation method of claim 1, wherein said pressing is carried out immediately after filtering.

4. The solid-liquid separation method of claim 1, wherein said filtering and pressing are carried out with a solid-liquid separator, and the same solid-liquid separator is used to carry out said filtering and pressing.

5. The solid-liquid separation method of claim 4, wherein the solid-liquid separator is a filter press or a belt press.

6. The solid-liquid separation method of claim 1, wherein the fluorine-containing polymer particles are prepared by emulsion polymerization and comprise tetrafluoroethylene homopolymer particles, vinylidene fluoride homopolymer particles, chlorotrifluoroethylene homopolymer particles or copolymer particles of at least two monomers selected from the group consisting of tetrafluoroethylene, hexafluoropropylene, perfluoro(alkyl vinyl ether), vinylidene fluoride, chlorotrifluoroethylene and ethylene.

7. The solid-liquid separation method of claim 1, wherein the cake obtained by pressing has a water content of not more than 180% by weight on dry basis.

8. The solid-liquid separation method of claim 1, which further comprises washing the filtrated cake with washing water after said filtering.

9. The solid-liquid separation method of claim 8, wherein said filtering, washing and pressing are carried out with a solid-liquid separator, and the same liquid-solid separator is used to carry out said filtering, washing and pressing.

10. The solid-liquid separation method of claim 1, which comprises adding a coagulant comprising an inorganic acid in an amount of 0.1 to 20 parts by weight, based on 100 parts by weight of the fluorine-containing polymer particles.

11. The solid-liquid separation method of claim 1, wherein said stirring comprises stirring with a shearing force so as not to render said particles water-repellent.

12. A solid-liquid separation method comprising:

adding a coagulant comprising an inorganic acid with stirring to an emulsified aqueous dispersion of fluorine-containing polymer particles in an amount of 0.1 to 20 parts by weight, based on 100 parts by weight of the fluorine-containing polymer particles, to obtain a slurry of coagulated particles under conditions so as not to render the coagulated particles water-repellent, filtering the slurry to obtain a cake, and pressing the cake.

13. The solid-liquid separation method of claim 12, wherein said stirring comprises stirring with a shearing force so as not to render said particles water-repellent.

* * * * *